United States Patent [19]

Carbonaro et al.

[11] Patent Number: 4,736,001

[45] Date of Patent: Apr. 5, 1988

[54] PROCESS FOR THE POLYMERIZATION OR COPOLYMERIZATION OF BUTADIENE IN THE PRESENCE OF SOLID PARTICLES INSOLUABLE IN THE REACTION MEDIUM

[75] Inventors: Antonio Carbonaro, Milan; Silvano Gordini; Salvatore Cucinella, both of San Donato Milanese, all of Italy

[73] Assignee: Enichem Elastomeri, S.p.A., Palermo, Italy

[21] Appl. No.: 13,229

[22] Filed: Feb. 2, 1987

Related U.S. Application Data

[63] Continuation of Ser. No. 859,055, May 2, 1986, abandoned.

[30] Foreign Application Priority Data

May 15, 1985 [IT] Italy ............................. 20717 A/85

[51] Int. Cl.$^4$ ................................................ C08F 4/52
[52] U.S. Cl. ........................................ 526/63; 526/98; 526/100; 526/137; 526/142; 526/143
[58] Field of Search ................... 526/63, 98, 100, 137, 526/142, 143

[56] References Cited

U.S. PATENT DOCUMENTS

| | | | |
|---|---|---|---|
| 3,397,195 | 8/1968 | Lukach | 526/63 |
| 3,803,053 | 4/1974 | Yoo | 502/102 |
| 4,242,232 | 12/1980 | Sylvester | 526/137 |
| 4,461,883 | 7/1984 | Takeuchi | 526/142 |
| 4,525,549 | 6/1985 | Carbonaro | 526/137 |

*Primary Examiner*—Paul R. Michl
*Assistant Examiner*—Terri Stevenson
*Attorney, Agent, or Firm*—Hedman, Gibson, Costigan & Hoare

[57] ABSTRACT

This invention concerns the production of 1,4-cis polybutadiene, or copolymers of butadiene with other related diolefins, through the catalytic polymerization or copolymerization of butadiene monomer by a continuous or discontinuous process carried out in the absence or substantial absence of solvents or diluents and operating in the presence of solid bodies.

30 Claims, No Drawings

PROCESS FOR THE POLYMERIZATION OR COPOLYMERIZATION OF BUTADIENE IN THE PRESENCE OF SOLID PARTICLES INSOLUABLE IN THE REACTION MEDIUM

This is a continuation, of application Ser. No. 859,005 filed May 2, 1986 now abandoned.

This invention concerns the production of 1,4-cis polybutadiene, or copolymers of butadiene with other related diolefins, through the catalytic polymerization or copolymerization of butadiene monomer by a continuous or discontinuous process carried out in the absence or substantial absence of solvents or diluents and operating in the presence of solid bodies.

Various catalytic process for the polymerization of butadiene are known in the art, suitable for producing polybutadiene with a high content of 1,4-cis units, which is particularly suited for the manufacture of tires and other elastomer articles. The catalysts generally utilized for this purpose are derived from the combination compounds of metals of transition such as titanium, cobalt, nickel, uranium and the rare earth metals, with alkyl and/or hydride derivatives of metals of groups IA, IIA and IIIA of the periodic system, as described for example in the U.S. Pat. Nos. 3,118,864, 3,178,402, 3,794,604 and 4,242,232 and in the Belgian Pat. Nos. 559,676, 573,680 and 791,709.

According to the processes of the known art, the polymerization of butadiene is most often carried out in a hydrocarbon solution for the purpose of controlling the temperature of polymerization and thus obtaining soluble, linear polymers, free or essentially free of gel and having a controlled molecular weight.

On the other hand, the production of 1,4-cis polybutadiene by mass polymerization has not found significant development in industrial practice, notwithstanding the evident advantages offered by a process carried out in the absence or substantial absence of solvent or diluents, in comparison with a conventional process in solution.

The reason for this lack of success are to be found principally:

(A) In the lack of suitable defined catalytic systems which satisfy the peculiarities required for mass polymerization and more particularly:

which, in the presence of an excess of monomer, do not give rise to "transfer" reactions, this being responsible for obtaining low molecular weight polymers, rarely usable in applications;

which do not cause secondary cross-linking reactions, cyclization and/or ramifications in the polymer, this being responsible for the formation of substantial quantities of gel, with greatly negative effects on the characteristics required for the finished product;

which present sufficiently high activity, so that the finished polymer contains a low level of catalytic residues, in order to obviate a washing treatment;

which retain a high activity and selectivity in the high temperature conditions required to operate in a highly viscous system and with satisfactory kinetics;

(B) In the technical, rheological and heat exchange difficulties relative to the treatment of highly viscous polymer masses. An example of a process for the mass polymerization of butadiene in order to produce 1,4-cis polybutadiene is described in the U.S. Pat. No. 3,770,710.

The U.S. Pat. No. 3,770,710 in fact concerns a process for the mass polymerization of diolefin monomers with lithium catalysts carried out in a conventional reactor, in two phases at different temperatures, and evaporating the monomer in order to control the temperature.

The operation in controlled phases derives exclusively from the need to prevent, or at least minimize, the phenomena relative to foam and to complete the polymerization at a higher temperature.

We are furthermore aware of the U.S. patent application Ser. No. 612,800 filed on May 22, 1984 and concerning a process for the catalytic polymerization of butadiene to 1,4-cis polybutadiene, carried out in the absence or substantial absence of solvents or diluents.

According to this process a catalytic mixture is prepared placing in contact, in a hydrocarbon vehicle, one or more neodymium compounds, one or more halogen contributing compounds, one or more hydroxyl containing compounds and an organometallic and/or hydride aluminum compound.

This catalytic mixture is placed in contact with the liquid butadiene monomer and the resulting mixture is fed continuously at one end of an elongated "plug-flow" type polymerization reactor, in which the polymerization of the butadiene takes place.

As an alternate, this polymerization reactor is fed continuously with a stream of the catalytic mixture and a stream of liquid butadiene.

The heat of polymerization is removed by paitial evaporation of the butadiene monomer, so that by controlling the pressure in same it is possible to maintain the temperature of polymerization within the predetermined range. By controlling also the composition of the catalyst, the butadiene/catalyst ratio, the temperature of polymerization and the time of residence in the reactor, it is possible to produce mixtures containing from approximately 25 to approximately 70% by weight of polymer, which are then discharged continuously from the other end of the polymerization reactor.

From the discharged mixture the 1,4-cis polybutadiene is recovered as a finished product, evaporating the unreacted butadiene and the eventual solvent utilized as a vehicle for the catalyst from the polymer mass containing a "short-stopper" for the catalyst and stabilizers intended to prevent thermo-oxidative degradation.

This evaporation takes place in a solvent removing extruder.

However when operating continuously with such a process at an inlet temperature of not less than 30° C., 1,4-cis polybutadiene is generally obtained whose Mooney viscosity value (ML) is not constant due to insufficient homogeneization of the system composed of catalyst, monomer and polymer.

This points out the evident inadequacy of such a product in satisfying the specifications imposed, aside from the doubtful reproducibility of results in a projected scale-up.

Now we have found that it is possible to overcome the above mentioned drawback by obtaining a 1,4-cis polybutadiene with a rigorously controlled molecular weight, thus avoiding fluctuations in the relative Mooney viscosity values.

Therefore the aim of this invention is a process which, through the combination of a suitable catalytic system and an adequate polymerization process, makes it possible to overcome the above difficulties and to obtain a high yield of linear 1,4-cis polybutadiene free of gel, with a high and rigorously controlled molecular weight, by means of polymerization carried out in absence of low boiling point hydrocarbon solvents or diluents or in presence of a minimum quantity of said low boiling point solvents or diluents (generally approximately 2% or less by weight referred to the butadiene monomer) and operating in the presence of solid bodies insoluble in the reaction medium, the polymerization being carried out by a continuous or discontinuous process.

The solids utilized for this purpose are organic as well as inorganic in nature.

The organic olids utilized are high molecular weight polymeric substances, preferably polyethylene and polystyrene in powder form, and carbons of various natures and origins such as the "blacks" usually utilized in the rubber industry.

The inorganic solids utilized are oxides and salts, whether natural or synthetic, preferably in a finely divided form, such as zinc oxide, titanium dioxide, celite, talcum, etc.

The quantities of solids utilized are less than 50% of the polymer produced, preferably in the range of 1–10% by weight.

The presence of solids such as mentioned above, up to contents of a few percentage units, does not modify the properties of the polybutadiene. Larger quantities may even prove favorable for certain characteristics of the polymer as they act either as vulcanization components or as inert reinforcing charges.

The solid body may be premixed with the monomer to be polymerized and/or the catalytic system, or else it can be added gradually during the polymerization process, particularly if the process is carried out discontinuously or in a "plug-flow" type elongated reactor.

A further advantage obtained with the use of inert solids added to the polymerization is better control of the molecular weights, thanks to improved contact between monomer and catalyst, with resulting saving of the aluminum compound.

More particularly, according to this invention:
a catalytic mixture is prepared by placing in contact in an inert hydrocarbon vehicle:
  (a) at least one neodymium compound chosen from among neodymium oxides, alcoholates, phenates and carboxyls, or mixtures of these with other rare earth elements;
  (b) at least one organic compound containing hydroxyl groups deriving from alcohols or phenols, or carboxyl groups, with the possible addition of water;
  (c) at least one halogen compound, chosen from among the secondary or tertiary alkyl, aryl or alkylaryl halogenides, halogenides or organic acids, metallic or organometallic halogenides, hydrohalogenic acids and halogens:
  (d) at least one organometallic compound of aluminum or relative hydride derivatives;
the quantity of compounds (a) and (b) being such as to respect a ratio of 2/1 to 80/1 between the hydroxy and/or carboxy groups and the neodymium atoms and to hold these components in contact in order to obtain a catalytic mixture in which the aluminum/neodymium atomic ratios of 20/1 to 80/1 and the halogen/neodymium ratios of 0.2/1 to 3/1 are respected;

this catalytic mixture and the liquid butadiene monomer, possible pre-mixed, are fed in quantities of $10^4$ to $4.10^5$ g.mols of butadiene for each g.atom of neodymium, either discontinuously into a polymerization reactor under agitation, or continuously at one end of a polymerization reactor in which takes place the polymerization of the mixture which runs by piston ("plug-flow"), operating in each case in the presence of solid bodies, controlling the temperature by partial evaporation, at constant pressure, of the butadiene monomer from the liquid phase of polymerization, until a mixture is obtained having a polymer content of approximately 25 to approximately 70% by weight;

the 1,4-cis polybutadiene is separated and recovered from said mixture discharged from the reactor.

In any case, polymerization can be carried out continuously in a one step process in an extruder type apparatus equipped with self-cleaning single or double screw, maintaining an inlet temperature of at least 30° C. and an outlet temperature not in excess of 130° C. As an alternate, it can be carried out continuously in several successive steps using, in the higher temperature step, extruder type reactors equipped with self-cleaning single or double screw, or else it can be carried out discontinuously in a reactor under agitation.

The vehicle utilized for the catalyst according to this invention can be composed of inert (non reacting) hydrocarbons, with a low or relatively low boiling point, alicyclic, cyclic or ramified, such as butane, pentane, hexane, cyclohexane and heptane, or mixtures thereof. The hydrocarbons, introduced with the catalyst in small quantity, even decidedly less than 5% by weight of the polymer produced, are separated from the polybutadiene upon completion of th polymerization, for example in a suitable solvent removing extruder.

According to another form of execution, the vehicle for the catalyst is composed of hydrocarbons, or hydrocarbon mixtures, of high molecular weight such as oil of paraffin and the like, or hydrocarbon oils required for formulations of oil-extended polybutadienes.

These hydrocarbons do not require separation and remain incorporated in the polybutadiene. It has been found in particular that when the content of oil of paraffin and the like is less than approximately 5% by weight of the polymer, the polymer's characteristics are not modified appreciably.

The neodymium compounds used in the preparation of the catalyst are chosen from among neodymium oxide ($Nd_2O_3$), neodymium alcoholates of aliphatic and cycloaliphatic alcohols, neodymium phenates and carboxylates of aliphatic, cycloaliphatic and aromatic organic acids. Of all the above, preference is given to neodymium oxide, neodymium tributylate, neodymium trinaphtenates and neodymium tri(2 ethyl-hexanoate), neodymium versatate or neodecanoate.

It is also possible to utilize mixture of neodymium with other rare earth elements, for example didymium, which is a mixture containing approximately 72% Nd, 10% La and 8% Pr. The organic compounds containing hydroxyl groups (alcoholic or phenolic) or carboxyl groups are chosen from among aliphatic and cycloaliphatic alcohols, phenols and substituted phenols, aliphatic, cycloaliphatic and aromatic acids.

Of all these preference is given to butyl alcohols, 2-ethylhexanoic acid and the naphtenic acids. These compounds can be utilized in free form, or partially or totally in the combined form with neodymium (neodymium alocholates, phenates and carboxylates), as long as a ratio in the range of 2/1 to 80/1 between the hydroxyl groups (including those of the water) and the free and/or combined carboxyl groups and the neodymium atoms is respected.

It has been found that the addition of limited quantities of water, as a hydroxyl contributing compound, is desirable in that it improves the activity of the catalyst. More particularly, this effect of the water manifests itself when ratios in the range of 1/1 to 5/1 are maintained between the aluminum atoms of the organometallic aluminum compound or relative hydric compound and the mols of added water, the preferred values being approximately 2/1.

The halogen contributing compounds utilized in the preparation of the catalyst are preferably chosen from among hydrochloric acid, diethylaluminum chloride, ethylaluminum dichloride, aluminum trichloride, ter-butylchloride, benzyl chloride and benzoyl chloride. In particular, hydrochloric acid can be introduced in the form of aqueous hydrochloric acid in order to furnish the desidered quantity of water.

The organometallic compounds of aluminum and relative hydric derivatives are aluminum trialkyls and the hydrides of aluminum alkyl. Preference is given to triethylaluminum, triisobutylaluminum and diisobytylaluminum monohydride.

The quantities of the various components of the catalyst are metered so as to maintain a ratio of gram atoms of aluminum/neodymium of 20/1 to 80/1 and a ratio of gram atoms of halogen/neodymium of 0.2/1 to 3/1.

In the preferred embodiment the values of the above mentioned ratios are of the order of 3/1-30/1 for the hydroxyl groups (including those of the water) and/or carboxyl/neodymium atoms, of the order of 25/1-50/1 for the aluminum atoms/neodymium atoms, and of the order of 1/1-2/1 for the halogen atoms/neodymium atoms.

According to the process of this invention the catalytic mixture is prepared by placing the above indicated catalytic components in contact in the hydrocarbon vehicle, operating at ambient or above ambient temperatures.

The order and the method of addition of the catalytic components are not particularly critical; however, according to one form of execution, the following are placed in contact in the hydrocarbon vehicle in the order indicated and at ambient temperature or lower (20°-25° C.):
neodymium alcoholate, phenate and/or carboxylate;
organometallic aluminum compound and/or relative hydric derivative;
halogenated compound;
hydroxyl and/or carboxyl compound and/or water.

According to another form of execution the following are placed in contact in the hydrocarbon vehicle in the order indicated and at a temperature of 50°-80° C.:
neodymium oxide;
hydroxyl and/or carboxyl organic compound;
halogenated compound;
water.

The mixture is then cooled to ambient temperature or lower (20°-25° C.) and the following is added:
organometallic aluminum compound or relative hydric derivative.

Operating as indicated above a catalytic solution, or else a catalytic mixture in which the catalyst is mostly dissolved in the relative hydrocarbon vehicle, is obtained.

The catalytic mixture thus prepared is mixed with liquid butadiene monomer, in such quantity as to respect a ratio of $10^4$ to $4.10^5$ between g.mols of butadiene and the g.atoms of neodymium. Mixing can be carried out in any apparatus ensuring good homogenization, for example a vessel under agitation acting as a polymerization reactor. Mixing is done at a suitably chosen temperature. The heat of reaction is dissipated by evaporating and recycling the butadiene at constant pressure. According to one form of execution in continuous, a stream of the catalytic mixture and a stream of butadiene containing the insoluble solid in suspension are introduced independently in a polymerization reactor, while adhering to the above indicated ratios.

In the elogated polymerization reactor the reaction mass moves, driven by piston or substantially driven by piston. Extruders, for example, in which the mass is driven by self-cleaning single or double screws, are suitable for the purpose. Polymerization is generally carried out at an inlet temperature $T > 30°$ C. and an outlet temperature not greater than 130° C. and preferably between an inlet value of the order of 50°-60° C. and an outlet value included between the former and 80°-100° C.

The pressures at which polymerization is carried out are those which ensure the presence of butadiene monomer in liquid phase. For the temperature range indicated above, these pressure values are suitably chosen from 3 to 18 bars absolute. Operating within the range of general conditions outlined above, a mixture is discharged from the reactor having a polymer content of approximately 25 to approximately 70% by weight, with residence times of 10 to 120 minutes. In the preferred operating conditions the overall residence times for the two steps are of the order of 20-60 minutes. For reasons of economy, it is convenient to operate with relatively high rates of convesion of butadiene to the relative polymer, discharging from the reactor mixtures with a polymer content of 60-70% by weight. According to an embodiment of this invention, the mixture coming from the polymerization reactor is sent to a mixing apparatus in which are fed the polymerization stopping agents ("short-stopper") and the stabilizers against thermo-oxidative degradation of the polymer, preferably in the form of solution in butadiene. To deactivate the catalyst it is preferable to use water or organic acids such as resin acids, or higher aliphatic alcohols (containing for example 8 to 18 carbon atoms in the molecule), or their combinations even after subsequent treatment, in quantities such a to exceed overall the sum of the catalytic components by at least 5-10 times in mols.

To the "short-stopper" other than acids are preferably added basifying agents soluble in it, such as ammonia, amines, epoxides and organic salts (alcoholates and carboxylates) of alkaline metals.

In addition to the usual antioxidant compounds used to preserve the polymer, such as sterically inhibited phenols and phosphites, radical capturing agents such as secondary amines and epoxides are preferably added to the hydrocarbon solution. The two solutions can conveniently be emulsified between them.

The mass thus treated can be sent to an adjacent heated screw apparatus (solvent removing extruder), in which the volatile substances are removed by evaporation, operating at temperatures in the range of 100° to 180° C. and at atmospheric or near atmospheric pressure.

This treatment serves to remove the unconverted butadiene, the eventual low boiling solvent introduced with the catalytic mixture, as well as the water introduced in excess of that required for the destruction of the catalytic system. The butadiene and eventual low boiling solvent are subjected to the usual treatments for their separation and recycling.

This polybutadiene furthermore has a 1,4-cis unit content generally above 97% and a Mooney viscosity (ML 1+4, 100° C.) of 30 to above 80.

By the process of this invention, it is therefore possible to obtain a linear polybutadiene free of gel and with a very high content of 1,4-cis units. This polymer requires no washing treatment for the separation of the catalytic residues.

Moreover, the process of this invention is simple and convenient, requires low power consumption and presents no problems of ecological nature in view of the elimination of the discharges. The process described can also be utilized advantageously for the copolymerization of butadiene with other related diolefins such as, for example, isoprene, piperilene, obtaining copolymers with an essentially 1,4-cis structure.

The following experimental examples are given by way of illustrations and do not constitute limits to this invention.

EXAMPLE 1

Preparation of the catalytic solution

A 12×55 mm teflon coated metal plate is introduced in a heavy walled glass bottle with a capacity of approximately 100 ml, after which the following are introduced in order:

| | |
|---|---|
| naphtenic acids (acidity number = 200) | 19.8 g |
| $Nd_2O_3$ (95%) | 4.04 g |
| t.Butylchloride | 4.25 ml |
| oil of paraffin | 45.0 ml |

The bottle is stoppered with a neoprene sealed perforated crown stopper and transferred to a water bath termostatically controlled at 80° C. By means of a revolving magnet, the metal plate is set in whirling agitation. After 5 minutes, 0.08 ml of HCl in 37% aqueous solution (C.Erba) is added to the reaction mixture by means of a micro syringe inserted through the rubber seal. After about 80 minutes the color of the suspension turns from grayish to nut-brown. The reaction is perused for a total of three hours at 80° C. The resulting dense solution, titered after it has been allowed to rest for three hours at ambient temperature, has an Nd content of 0.343 mol/l.

Over approximately 5 minutes it is transferred slowly to a glass flask which already contains 820 ml of 0.97 molar solution of $(i.C_4H_9)_2AlH$ in paraffin oil under mechanical agitation, introduced beforehand in the flask in dry $N_2$ atmosphere.

The solution thus obtained is held for 24 hours at ambient temperature before use. Elementary analysis reveals the following molarities.

| | |
|---|---|
| Nd | 0.027 g/atom/l |
| Al | 0.892 g/atom/l |

-continued

| | |
|---|---|
| Cl | 0.040 g/atom/l |

Butadiene Polymerization—Reference test

The polymerization reactor consists of a steel cylinder arranged horizontally, with a capacity of approximately 2.8 l, equipped with a mechanical agitator (shaft and blades) rotated at 40 rpm by a high power motor and a system (located in the upper portion of the reactor) for conveying, cooling and recycling the vapors developed by the reaction. In the reactor, also equipped with a heating jacket with built-in electrical resistances, a vacuum is applied by means of a mechanical pump (0.1 torr), after which the following are introduced in order:

| | |
|---|---|
| butadiene | 1000 g |
| catalytic solution as described above | |
| (0.61 m mols of Nd) | 22.6 ml |

Before the catalyst is introduced, the butadiene inside the reactor is thermostatically controlled at 60° C. The equilibrium pressure is approximately 6.7 atm., and this pressure is maintained throughout the duration of the test. In the case of polymerization the wall temperature is held at a couple of degrees higher than measured inside, for the purpose of compensating heat loss.

The values resulting from the reaction mass are conveyed from the reactor cycle to a 4×6 diameter steel coil immersed in cold ethyl alcohol at minus 78° C. and connected to a collection tank equipped with a level indicator. Inside the tank, in which a bottom layer of butadiene is mainted from the beginning, there is another steel coil in which a cold fluid is made to circulate in order to maintain the liquid present at approximately minus 15° C. The metering pump draws the liquid from the tank and returns it to the reactor in order to maintain a constant level in the tank.

The power absorbed by the motor driving the agitator shaft is monitored by an ammeter: this is held constant for the first 10 minutes approximately, after which it begins to increase slowly until the 24th minute approximate-ly, thus indicating the formation of a polymeric mass of such quantity and consistency as to hinder the movement of the agitator, whose speed of revolution is reduced.

The polymerization is interrupted after 26.75 minutes from the beginning by introducing in the reactor 0.5 l of distilled and deareated water. The unreacted butadiene is removed first by depressurization, and then by applying vacuum in the autoclave, whose jacket is maintained at the temperature set initially (60°).

The polymer is removed from the open reactor in aliquots taken from various points (7 in all) which are dried separately under vacuum at 50° C. The Mooney viscosity values (1+4, 100°) ML, measured for the individual aliquots give the following results:

| | |
|---|---|
| ML max (highest value found) = | 52 |
| ML min (lowest value found = | 34 |
| ML (average value for the entire polymer) = | 42.5 |

The product obtained weights a total of 591 g (59.1% conversion). The content in 1,4-cis units determined by the infra-red method is 98.2%; the intrinsic viscosity measured in tetrahydrofurane at 25° C. is 3.6; neither gel nor microgel is present.

EXAMPLES 2-4

Three tests of butadiene polymerization are made in the same equipment and following the same methods as described in the reference Example 1, with the only difference that, before closing the reactor and introducing the butadiene, variable quantities of polyethylene (PE) powder are introduced, 80% of which have particle dimensions included between 50 and 25 microns.

The results are given in Table 1 in which the conversion % is expressed by the polybutadiene produced to the exclusion of the weight relative to the PE.

TABLE 1

| PE % wt | Conv. % | ML max | ML min | delta ML | ML |
|---|---|---|---|---|---|
| 2.5 | 63 | 38 | 30 | 8 | 34.8 |
| 5.0 | 61 | 39.5 | 36 | 3.5 | 37.5 |
| 9.0 | 65 | 41 | 40 | 1 | 41 |

EXAMPLE 5-7

Operating as described in Example 1 and using the same equipment, tests are made with the reagents and quantities there indicated, but with the addition of variable weights of Celite (silicate, surface area 1-3 m$^2$/g) for each test. The celite is placed in the reactor before it is closed and placed under vacuum.

The principal results obtained are summarized in Table 2.

TABLE 2

| Celite % wt | Conv. % | ML max | ML min | delta ML | ML |
|---|---|---|---|---|---|
| 1.6 | 65.6 | 53.5 | 40 | 13.5 | 50 |
| 4.7 | 65.4 | 56.5 | 48.5 | 8 | 53 |
| 8.5 | 60.5 | 47 | 43.5 | 3.5 | 45 |

EXAMPLES 8 AND 9

In a manner similar to that described in Example 1, two butadiene polymerization tests are made using the methods and quantities there indicated, but operating in the presence of 15 g of TiO$_2$ and, respectively, 50 g of talcum ("medium") introduced in the autoclave before the butadiene and the catalyst.

After 26.75 minutes of reaction the test is interrupted with water according to the procedure already described (see Ex. 1) and the polymer obtained is evaluated. The results are illustrated below.

| Additive | Conv. % | ML max | ML min | delta ML | ML |
|---|---|---|---|---|---|
| TiO$_2$ 15 g | 46.2 | 65 | 58 | 7 | 60 |
| Talcum 50 g | 52.1 | 42 | 36 | 6 | 37.8 |

We claim:

1. A process for preparing 1,4-cis polybutadiene or butadiene copolymers with other related diolefins by the catalytic polymerization or copolymerization of butadiene monomer, in the absence or substantial absence of solvents or diluents, said process comprising: preparing a catalytic mixture by placing in contact in an inert hydrocarbon vehicle:
   (a) at least one neodymium compound selected from neodymium oxide, alcoholates, phenates and carboxylates or mixtures thereof with other rare earth elements;
   (b) at least one organic compound containing alcoholic or phenolic hydroxyl groups or carboxyl, selected from alcohols, phenols and carboxylic acids, and optionally water;
   (c) at least one halogenated compound, selected from secondary or tertiary alkyl halogenides, aryl or alkylaryl halogenides, halogenides of organic acids, metallic or organometallic halogenides, and halogens;
   (d) at least one organometallic aluminum compound or hydride derivatives thereof; wherein the amount of compounds (a) and (b) are such that the ratio between the hydroxyl groups including those of water and/or carboxyl groups and the neodymium atoms is from 2/1 to 80 and maintaining contact of said components in order to obtain a catalytic mixture having an aluminum/neodymium ratio of from 20/1 to 80/1 and a halogen/neodymium ratio of from 0.2/1 to 3/1,
feeding said catalytic mixture and liquid butadiene monomer separately or premixed in an amount of from $10^4$ to $4.10^5$ g.mols of butadiene per g.atom, either discontinuously in an agitated polymerization reactor, or continuously at one end of an elongated reactor in which flowing of the polymerization mixture is carried out by a piston ("plug-flow") in the presence of solid particles insoluble in the reaction medium,
controlling the temperature of the polymerization reaction through the partial evaporation of the butadiene monomer from the liquid phase of polymerization until a polymer mixture with a polymer content of approximately 25 to approximately 70% by weight is obtained,
discharging the polymer from the other end of the reactor, and
separating and recovering 1,4-cis polybutadiene from said discharged mixture.

2. The process of claim 1 wherein the solid particles are organic or inorganic compounds.

3. The process of claim 2 wherein the solid particles are organic compounds selected from polymeric substances and carbon powder.

4. The process of claim 3 wherein the organic compounds are selected from polyethylene, polystryrene, lamp black and carbon black.

5. The process of claim 2 wherein the solid particles are inorganic compounds selected from synthetic oxides and salts.

6. The process of claim 5 wherein the inorganic compounds are selected from titanium dioxide, zinc oxide, celite and talcum.

7. The process of claim 1 wherein the amount of solid particles is less than 50% by weight based on the weight of the polymer or copolymer produced.

8. The process of claim 7 wherein the solid particles are present in an amount of from 1 to 10% by weight.

9. The process of claim 1 wherein the inert hydrocarbon vehicle is selected from butane, pentane, hexane, cyclohexane, heptane and mixtures thereof, oil of paraffin and hydrocarbon oils suitable for formulations of oil-extended polybutadiene.

10. The process of claim 1 wherein the neodymium compounds are selected from neodymium oxide (Nd$_2$O$_3$), neodymium tributylate, neodymium trinaphthenate, tri(2-ethyl-hexaneoate) and the corresponding didymium compounds.

11. The process of claim 1 wherein the organic compounds containing hydroxyl and carboxyl groups are selected from butyl alcohol, 2-ethylhexylic acid and naphthenic acid.

12. The process of claim 1 wherein the halogenated compounds are selected from hydrochloric acid, diethylaluminum chloride, terbutylchloride, benzyl chloride and benzoyl chloride.

13. The process of claim 1 wherein the organometallic aluminum compounds and hydride derivatives thereof are selected from trialkyl aluminum and alkyl aluminum hydrides.

14. The process of claim 13 wherein the aluminum compounds are selected from triethylaluminum, triisobutylaluminum and diisobutylaluminum monohydrate.

15. The process of claim 1 further comprising adding water to the catalyst in an amount such that the ratio of aluminum atoms of the organometallic aluminum compound or hydride derivatives thereof to the mols of water added is from 1/1 to 5/1.

16. The process of claim 15 wherein the ratio of aluminum atoms of the organometallic aluminum compound or hydride derivatives thereof to the mols of water added is about 2/1.

17. The process of claim 1 wherein the ratio of hydroxyl groups (including those in the water) and/or carboxyl group to neodymium atoms is from about 25/1 to about 50/1 and the ratio of halogen atoms to neodymium atoms is from about 1/1 to about 2/1.

18. The process of claim 1 wherein the polymerization reaction is carried out at a pressure of 3 to 18 bars absolute.

19. The process of claim 1 wherein the total residence time during the polymerization reaction is between 10 and 120 minutes.

20. The process of claim 19 wherein said residence time is from about 20 to about 60 minutes.

21. The process of claim 1 wherein the polymerization is carried out in a one step continuous process in an extruder-type apparatus equipped with a self-cleaning single or double screw while maintaining an inlet temperature of not less than 30° C. and an outlet temperature not in excess of 130° C.

22. The process of claim 1 wherein the polymerization reaction is carried out continously using a homogeneous reactor under agitation maintained at a temperature of from 30° to 130° C.

23. The process of claim 1 wherein the polymerization reaction is carried out discontinuously in a reactor under agitation operating at a temperature of from 30° to 130° C.

24. The process of claim 1 further comprising condensing the vaporized butadiene monomer and recycling the condensed butadiene monomer directly to the polymerization reactor.

25. The process of claim 24 wherein the the polymerization reaction is continuous, said process further comprising adding a polymerization stopping agent and stabilizer against thermo-oxidative degradation to the polymer mixture in a mixing apparatus placed in series with the polymerization reactor.

26. The process of claim 25 wherein the polymerization stopping agent is selected from water, organic acids and $C_8$–$C_{18}$ aliphatic alcohols.

27. The process of claim 26 wherein the basifying agent selected from ammonia, amines, epoxides and organic satls (alcoholates and carboxyls) of alkaline metals is added to the water and alcohol.

28. The process of claim 25 wherein the polymerization stopping agent includes antioxidant compounds and radical capturing agents selected from secondary amines and epoxides.

29. The process of claim 28 wherein the polymerization stopping agent and the radiacal capturing agent are introduced to the reaction in the form of an emulsion in the presence of liquid butadiene.

30. The process of claim 25 wherein the reaction mixture is deprived of low boiling substances, operating to temperatures of 100° to 180° C., at atmospheric pressure, in a heated screw apparatus placed in series with said mixing apparatus.

* * * * *